Sept. 20, 1971      A. OEHL      3,605,946

POWER TRANSMISSION LUBRICATION ARRANGEMENT

Filed March 11, 1970

Inventor
Adolf Oehl
BY Charles R. White
Attorney

United States Patent Office 3,605,946
Patented Sept. 20, 1971

3,605,946
POWER TRANSMISSION LUBRICATION
ARRANGEMENT
Adolf Oehl, Budenheim, Germany, assignor to
General Motors Corporation, Detroit, Mich.
Filed Mar. 11, 1970, Ser. No. 18,411
Claims priority, application Germany, Mar. 20, 1969,
G 69 11 180
Int. Cl. F01m 9/06; F16n 7/40
U.S. Cl. 184—11                                    7 Claims

ABSTRACT OF THE DISCLOSURE

In a vehicle power transmission lubricant is pumped by a pair of meshing helical gears to lubricate highly loaded bearings of the transmission when the transmission is operative to provide forward drive for the vehicle.

Figure 1:
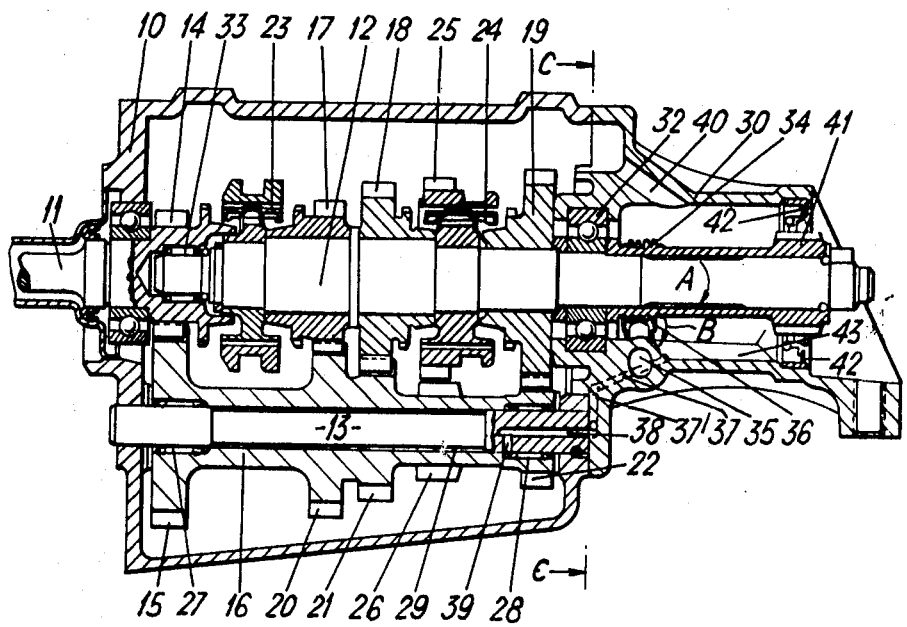

This invention relates to power transmission lubrication arrangements for ensuring adequate lubrication of heavily loaded bearings of a motor vehicle change-speed gear-box when the gear-box is operative to transmit rotary drive for forward drive of the vehicle.

The power transmission lubrication arrangement according to the invention also ensures lubrication of a reverse pinion of the gear-box.

Figure 2:
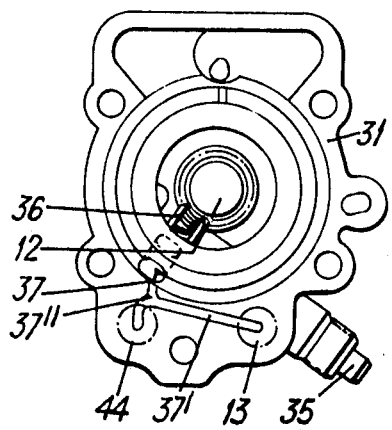

In the drawing:

FIG. 1 is a longitudinal section through a motor vehicle change-speed gear-box according to the invention; and FIG. 2 is a transverse section of part of the gear-box of FIG. 1 viewed in the direction of the arrows C-C' in FIG. 1.

FIG. 1 shows a motor vehicle power transmission, specifically a four-speed change-speed gear-box including a gear-box housing 10 in which is mounted one end of a drive shaft 11. Also mounted in the housing 10 are a mainshaft 12, a fixed counter shaft spindle 13. A reverse spindle 44, indicated in FIG. 2, is also mounted in the housing 10. The drive shaft 11 has, formed in one piece therewith, a drive pinion 14 which is constantly in mesh with a gear 15 on a hollow countershaft 16. The countershaft 16 is rotatably supported on the spindle 13 by needle bearings 27, 28 carried by the spindle 13 adjacent its ends. Mounting the countershaft 16 in this way enables an annular clearance 29 to be maintained between the countershaft 16 and the spindle 13, and the purpose of this will be explained later. The mainshaft 12 carries axially fixed but freely rotatable toothed gears 17, 18, 19, and the countershaft 16 has corresponding gears 20, 21, 22. The mainshaft 12 also carries synchronizer devices 23 and 24 for positively connecting the appropriate ones of gears 17, 18, 19 with the mainshaft during changes of ratio from first to third speeds. Fourth speed is obtained by direct coupling of the drive shaft 11 to the mainshaft 12.

The synchronizer device 24 carries teeth 25, which during engagement of reverse speed are connected with a pinion 26 on the countershaft 16 by the interposition of a reverse pinion or idler gear, not shown. The gears 17, 18, 19 are in constant mesh with the gears 20, 21, 22 respectively of the countershaft 16.

When the gear 19, which is a first speed gear, is coupled to the mainshaft 12, the loads to be taken by the bearing 28 for the countershaft 16 are particularly large because the ratio between the gears 22 and 19 is the largest of the ratios in the gear-box. Satisfactory operation of the power transmission necessitates good lubrication of bearing 28.

The mainshaft 12 is supported at one end by a surrounding needle bearing 33 fitted in an axially extending recess in the end of the drive shaft 11 and adjacent its other end of the mainshaft is supported by a surrounding ball race mounted on a web constituted by an inward extension of a mounting flange 31 for securing the gear-box in the vehicle. An end portion 30 of the housing 10 extends beyond the flange 31, and the end portion of the mainshaft 12 extends through this portion.

A helically toothed drive wheel 34 for a tachometer drive is fixedly mounted on the end portion of the mainshaft and is in mesh with a helically toothed driven wheel 36 fixedly mounted on a tachometer shaft 35 mounted on the housing below the mainshaft and projecting at right angles to the axis of the mainshaft. The wheels 34 and 36 constitute first and second helical gear means for the supply of lubricant under pressure, as will be explained later. The end portion 30 of the housing 10 defines a space into which an oil deflector rib 43 formed as a projection from the housing extends. This deflector rib lies parallel to but below the end portion of the mainshaft 12, and one end of the rib is adjacent the driven wheel 36. A bore 37 extends from the rib 43 adjacent the drive wheel 36, through the housing 10 into the attachment flange 31 where it branches into two bores 37' and 37" leading to the fixed spindles 13 and 44 respectively. These bores or branches 37' and 37" form a connection between the open space in the gear-box end portion 30 and an axially extending bore 38 in a respective end of each spindle 13 and 14, one only being shown in FIG. 1, namely the bore 38 in spindle 13. In each spindle 13 and 44 a bore 39, only the one in spindle 13 being shown, extends radially inwards from the circumference of the spindle until it intersects the axially extending bore 38. The bore 37, its branches 37' and 37", and the respective intersecting bores 38, 39 form a connection for passage of lubricant from the open space in the gear-box end portion 30 to the respective spindle bearings in the housing 10, as will be more fully explained later.

The gear-box end portion 30 is connected to the interior of the housing 10 by way of a bore 40, so that oil splashed up in the housing 10 can pass through the bore 40 and enter the end portion 40 at a position above the tachometer drive wheel 34. The drive wheel 34 is formed in one piece with a splined sleeve 41 fixed on the mainshaft 12. This splined sleeve 41 transmits drive from the mainshaft through a coupling sleeve, not shown, to a propeller shaft, not shown. An annular lip seal 42 is disposed between the end of the spline sleeve 41 and the end wall of the gear-box end portion 30.

In operation, oil splashed up in the housing 10 passes through the bore 40 and falls on the drive wheel 34, whose helical teeth drive the oil outwardly into contact with the lip seal 42. This oil runs back from the lip seal 42 and is deflected by the deflector rib 43 so as to pass under the driven wheel 36 on the tachometer drive 35 and passes into the bore 37. The meshing pair of wheels 34 and 36, when forward drive is being transmitted to the mainshaft 12, rotate in the direction shown by the arrows A and B in FIG. 1, and in this direction of rotation pump the oil into the bore 37 so that a copious supply of oil under pressure is directed through the bore 37, branches 37' and 37" and bores 38, 39 to the bearings of the respective spindles 13 and 44. The heavily loaded bearing 28 for the countershaft 16 is copiously lubricated, and oil also passes along the annular clearance 29 to lubricate the other bearing 27 for the countershaft 16.

Oil delivery to the reverse pinion takes place only when forward drive is being transmitted, for when reverse drive is engaged the mainshaft 12 and the gear wheels 34 and 36 will rotate in the opposite direction to that shown by the arrows A and B. However, sufficient oil is supplied to the reverse pinion during forward drive that the bearing remains adequately lubricated for the usually brief periods during which reverse drive is engaged, as the bearings 28 of the countershaft 16 is not heavily loaded in such conditions the lubrication supplied during forward drive is sufficient for it, even though no lubricant is supplied to it either during reverse drive.

I claim:

1. A change-speed gear-box for a motor vehicle comprising:
a housing;
input means extending into said housing and arranged to be driven by an engine of the vehicle;
output means rotatably mounted in said housing;
a spindle fixedly mounted in said housing;
gear means rotatably supported on said spindle for transmitting rotary drive from said input means to said output means for forward drive of the vehicle;
bearing means carried by said spindle for providing said rotary support of said gear means;
secondary drive means operatively mounted in said housing adjacent said output means;
first helical gear means fixedly mounted on said output means;
second helical gear means fixedly mounted on said secondary drive means and meshing with said first helical gear means;
a chamber adapted to contain a liquid lubricant for said helical gear means;
a bore providing a tubular connection between said bearing means and said chamber at a position adjacent said second helical gear means, whereby, when rotary drive is transmitted by said first recited gear means to said output means for forward drive of the vehicle, lubricant is supplied under pressure by said helical gear means to said bearing means.

2. A change-speed gear-box for forward and reverse drive of a motor vehicle comprising a housing having a gearing lubricant therein;
input means extending into said housing;
output means mounted in said housing;
a spindle fixedly mounted in said housing;
countershaft gear means rotatably supported on said spindle for transmitting rotary drive from said input means to said output means;
bearing means carried by said spindle for providing said rotary support of said gear means;
secondary drive means operatively disposed in said housing adjacent said output means;
first helical gear means fixedly mounted on said output means;
second helical gear means fixedly mounted on said secondary drive means and meshing with said first helical gear means;
said housing having a lubricant chamber in which said helical gear means are mounted;
a bore providing a tubular connection between said bearing means and said lubricant chamber adjacent said second helical gear means, whereby, when rotary drive is transmitted by said first recited gear means to said output means for forward drive of the vehicle, lubricant is supplied under pressure by said helical gear means to said bearing means.

3. A motor vehicle change-speed gear-box comprising:
a housing adapted to contain a gearing lubricant therein;
input means extending into said housing and arranged to be driven by an engine of the vehicle;
output means rotatably mounted in said housing;
a spindle fixedly mounted in said housing;
forward and reverse drive gear means rotatably supported on said spindle for transmitting rotary drive from said input means to said output means;
bearing means carried by said spindle for providing said rotary support of said gear means;
secondary drive means mounted for rotation in said housing adjacent said output means;
first helical gear means fixedly mounted on said output means;
second helical gear means fixedly mounted on said secondary drive means and meshing with said first helical gear means;
a lubricant chamber in which said helical gear means are operatively disposed;
a bore providing a tubular connection between said bearing means and said lubricant chamber adjacent said second helical gear means, whereby, when rotary drive is transmitted by said first recited gear means to said output means for drive of said vehicle, lubricant is supplied from said chamber under pressure by said helical gear means to said bearing means.

4. A motor vehicle change-speed gear-box comprising a housing adapted to contain a gearing and bearing lubricant therein;
input means extending into said housing and arranged to be driven by an engine of the vehicle;
output means mounted for rotation in said housing;
a spindle fixedly mounted in said housing;
gear means rotatably supported on said spindle for transmitting rotary drive from said input means to said output means;
bearing means carried by said spindle for providing said rotary support of said gear means;
secondary drive means mounted at said housing adjacent said output means;
first helical gear means fixedly mounted on said output means;
said housing having a separate chamber for receiving the lubricant therein;
second helical gear means fixedly mounted on said secondary drive means and meshing with said first helical gear means in said case;
a bore providing a tubular connection betweeen said bearing means and said chamber at a position adjacent said second said second helical gear means, whereby, when rotary drive is transmitted by said first mentioned gear means to said output means for forward drive of the vehicle, lubricant is supplied under pressure by said helical gear means to said bearing means;
said gear means comprising a countershaft gear unit;
a reverse pinion spindle; and
said bore having a lubricant feed branch extending therefrom to a lubricant feed port adjacent said reverse pinion spindle.

5. A power transmission comprising:
transmission input means and transmission output means;
a countershaft spindle;
bearing means carried by said countershaft spindle;
a countershaft rotatably supported by said bearing means;
gear sets providing forward speed ratios and a reverse speed ratio;
a secondary drive shaft adjacent said transmission output means;
first helical gear means fixedly mounted on said transmission output means;
second helical gear means fixedly mounted on said secondary drive shaft and meshing with said first helical gear means;
a conduit extending from adjacent said second helical gear means to said countershaft spindle;
said countershaft spindle having an axially extending bore therein opening from an end of said countershaft spindle adjacent said conduit;
a radially directed bore opening from a circumferential portion of said countershaft spindle inwardly thereof to interconnect with said axially extending bore, said bores forming a continuation of said conduit, whereby, on operation of said power transmission, lubricant supplied to said helical gear means is pumped under pressure by said helical gear means through said conduit and directed to said bearing means.

6. A power transmission comprising:
transmission input means and transmission output means;
a spindle;
bearing means carried by said spindle;
gear sets rotatably supported by said bearing means and providing at least one forward speed ratio;
a secondary drive shaft adjacent said transmission output means;
first helical gear means fixedly mounted on said transmission output means;
second helical gear means fixedly mounted on said secondary drive shaft and meshing with said first helical gear means;
a conduit extending from adjacent said second helical gear means to said spindle, whereby, on operation of said power transmission, lubricant supplied to said helical gear means is pumped by said helical gear means through said conduit and directed to said bearing means.

7. A power transmission comprising:
transmission input means and transmission output means;
a spindle;
bearing means carried by said spindle;
a spindle for a reverse pinion;
gear sets rotatably supported by said bearing means and providing at least one forward speed ratio and a reverse speed ratio;
a secondary drive shaft adjacent said transmission output means;
first helical gear means fixedly mounted on said transmission output means;
second helical gear means fixedly mounted on said secondary drive and meshing with said first helical gear means;
a conduit extending from adjacent said second helical gear means to said spindle, whereby, on operation of said power transmission, lubricant supplied to said helical gear means is pumped by said helical gear means through said conduit and directed to said bearing means;
said gear sets comprising a countershaft and a reverse pinion;
and said conduit having a branch conduit leading therefrom to adjacent said spindle for the reverse pinion for supply of lubricant to said spindle for the reverse pinion.

References Cited
UNITED STATES PATENTS

| | | | |
|---|---|---|---|
| 1,220,810 | 3/1917 | Alquist | 184—6.12 |
| 1,270,549 | 6/1918 | Perrin | 74—12 |
| 1,806,541 | 5/1931 | Gustafson | 74—12 |
| 2,525,373 | 10/1950 | Roos | 184—11 |
| 2,475,242 | 7/1949 | Iavelli | 184—6.12X |
| 2,608,273 | 8/1952 | Roos | 184—11 |
| 3,097,546 | 7/1963 | Kelbel et al. | 184—6.12X |
| 3,192,788 | 7/1965 | Fodrea | 184—6.12X |
| 3,195,682 | 7/1965 | Reneerkens | 184—6.12X |
| 3,467,221 | 9/1969 | Janke | 184—6.12 |
| 3,508,630 | 4/1970 | Keller et al. | 184—11 |

MANUEL A. ANTONAKAS, Primary Examiner

U.S. Cl. X.R.

184—6.12